United States Patent [19]

Ito et al.

[11] 4,003,766

[45] Jan. 18, 1977

[54] WELDING MATERIALS FOR ALUMINUM-COATED STEEL

[75] Inventors: Yoshinori Ito, Nishinomiya; Mutsuo Nakanishi, Amagasaki; Masamichi Nakakoji, Nagaokakyo; Masahiko Ikeda, Ashiya; Tadashi Ito, Nara, all of Japan

[73] Assignee: Sumitomo Metal Industries, Ltd., Japan

[22] Filed: Feb. 21, 1975

[21] Appl. No.: 551,649

[30] Foreign Application Priority Data

Nov. 21, 1974 Japan.............................49-19979

[52] U.S. Cl. .................................. 148/24; 148/26
[51] Int. Cl.² ....................................... B23K 35/34
[58] Field of Search ............................ 148/26, 24

[56] References Cited

UNITED STATES PATENTS 3,201,292  8/1965  Miltschitzky ........................ 148/26
3,211,591  10/1965  Miltschitzky ........................ 148/26
3,328,212  6/1967  Coless ................................. 148/26

Primary Examiner—Peter D. Rosenberg
Attorney, Agent, or Firm—Watson, Cole, Grindle & Watson

[57] ABSTRACT

In welding materials, such as a composite electrode enclosing a flux within a tubular hoop, a combination of a solid electrode and a flux, a core electrode coated with a flux and the like, for welding aluminum-coated steel comprising on weight basis less than 1.5% of Si less than 1.0% of Mn, and 2 to 15% of $CaF_2$ and 15 to 50% of a mixture of oxides having a basicity ranging from 1.0 to 12.5, the balance being substantially Fe.

7 Claims, No Drawings

WELDING MATERIALS FOR ALUMINUM-COATED STEEL

DETAILED DESCRIPTION OF THE INVENTION

This invention relates to welding materials for aluminium-coated steel, particularly for steel which has been spray-coated with molten aluminium.

The term "welding materials" as referred to herein means generically a combination of materials comprising slag forming agents, deoxidizers, organic materials, steel and the like contained in a flux, welding electrode and the like.

Because of its excellent corrosion and thermal resistances, aluminium-coated steel has been employed for various purposes. There has been, however, available no special welding materials for aluminium-coated steel, so that conventional welding materials have been unavoidably employed for welding the same.

When aluminium-coated steel is welded by employing such conventional welding materials for steel, the affinity of aluminium for the oxygen dissolved in the weld metal is so strong that the metallic Si and Mn, including Fe-Si, Ca-Si, Fe-Mn and the like, added for the deoxidation in the welding electrode and flux are not consumed. As a result, metallic Si and Mn are dissolved excessively in the weld metal. Moreover, metallic Si and Mn are also formed by the reduction of oxides of Si and Mn such as $SiO_2$, $CaSiO_3$, $Na_2SiO_3$, MnO, $MnO_2$, $MnSiO_3$, $MnCO_3$ and the like which are, contained in the flux as slag forming agents. The Si and Mn are again dissolved in the weld metal thereby increasing the crack sensibility by increasing the hardenability and reducing markedly the notch toughness through the formation of lath-like bainitic structures.

It is thus an object of this invention in view of such a problem to provide welding materials for aluminium-coated steel which are capable of improving the properties of the weld metal by controlling the Si- and Mn-contents in the weld metal to within preferred ranges without deteriorating the welding operability.

According to this invention, there are provided welding materials which are comprised of a flux and a welding electrode, such as a composite electrode enclosing a flux within a tubular hoop, a core wire electrode coated with a flux for arc welding and the like. These materials comprise on weight basis less than 1.5% of Si and/or less than 1.0% of Mn, and 2 to 15% of $CaF_2$ and 15 to 50% of a mixture of oxides which have a basicity ranging from 1.0 to 12.5, the balance being essentially Fe. The term "basicity" as referred to herein means a ratio by weight of the amount(s) of CaO and/or MgO with respect to $SiO_2$ and may be represented by the following formula:

$$(CaO + MgO)/SiO_2$$

wherein CaO, MgO and $SiO_2$ are the amounts by weight which are formed finally by decomposition during welding.

Such limitations are a result of the following facts: (1) When the Si-content exceeds 1.5% and the Mn-content exceeds 1.0%, the weld metal will be deteriorated in notch toughness. (2) If the amount of $CaF_2$ is less than 2%, the slag formed during the welding will be excessively fluid and if the amount of $CaF_2$ exceeds 15%, the fluidity of the slag will be excessively poor, both causing the welding operation to be inconvenient. (3) If the oxides are contained in an amount of less than 15%, the slag will be formed to a lesser extent to enhance the cooling rate of the weld metal thereby causing a reduction in toughness of the weld metal and if the oxide content exceeds 50%, the welding operation will be difficult to perform. (4) If the basicity is less than 1.0%, the weld metal will be deteriorated in toughness and if it exceeds 12.5%, the welding workability will be deteriorated.

This invention will be illustrated further by way of the following examples.

EXAMPLE 1

The welding materials according to this invention were compared with ones used conventionally for welding of aluminium-coated steel plates as shown in Table 3, by employing welding materials shown in Table 1 under the welding conditions as shown in Table 2. Table 4 provides the test results of weld metals.

Table 1

| | Run No | Composition of welding materials for submerged arc welding, % by weight | | | | | | | | | | | | | | Basicity |
|---|---|---|---|---|---|---|---|---|---|---|---|---|---|---|---|---|
| | | Flux of sintering type | | | | | | | | | | | Welding electrode | | | |
| | | Si | Mn | CaO | MgO | $CoF_2$ | $SiO_2$ | $Al_2O_3$ | $TiO_2$ | $Na_3O$ | $ZrO_2$ | CeF | Si | Mn | Fe | |
| Present Invention | A | — | — | 4.5 | 15 | 5.0 | 11.5 | 2.5 | 4.5 | 2.0 | 0.5 | — | tr | 8.35 | Balance | 1.7 |
| | B | 0.15 | — | 5.0 | 16 | 4.0 | 5.0 | 1.5 | 4.5 | 2.3 | 4.5 | 9.0 | tr | 0.15 | '' | 4.2 |
| | C | — | — | 5.0 | 15 | 4.5 | 4.0 | 2.5 | 4.5 | 2.0 | 4.5 | 10.0 | 0.15 | 0.35 | '' | 5.0 |
| | D | 0.1 | 0.2 | 7.0 | 15 | 4.0 | 3.5 | 4.5 | 4.5 | 2.7 | 4.5 | 4.0 | tr | 0.15 | '' | 63 |
| | E | 0.05 | 0.15 | 5.0 | 15 | 4.0 | 8.5 | 2.5 | 4.5 | 1.8 | 4.5 | 4.0 | tr | 0.15 | '' | 2.4 |
| Conventional procedure | F | 0.3 | 0.85 | 6.0 | 13 | 3.5 | 17.5 | 4.5 | 2.0 | 2.4 | — | — | 0.015 | 0.2 | '' | 1.1 |
| | G | 0.25 | 0.75 | 12.0 | 5.5 | 2.5 | 19 | 4.5 | 4.0 | 1.5 | — | — | 0.015 | 0.3 | '' | 0.9 |
| | H | 0.6 | 1.75 | 7.5 | 14.5 | 3.5 | 13.5 | 2.5 | 4.0 | 2.2 | — | — | tr | 0.15 | '' | 1.6 |
| | I | 0.2 | 0.6 | 6.0 | 14 | 4.5 | 13.5 | 2.5 | 3.5 | 1.6 | 3.5 | — | tr | 0.15 | '' | 1.5 |

Note : The welding electrodes in Run Nos. A and C were composite electrodes and those in other runs were solid electrodes.

Table 2

| Welding conditions in each pass for double welding | | |
|---|---|---|
| | Finishing welding | Backing welding |
| Welding current, Amp. | 900 | 750 |
| Arc voltage, V | 40 | |
| welding speed, cm/min. | 40 | |

Table 3

| Steel plate to be welded | | | | | |
|---|---|---|---|---|---|
| Thickness: 12mm | | | | | |
| Grade: 50 Kg/mm² high strength steel | | | | | |
| Composition | C | Si | Mn | P | S |
| | 0.15 | 0.30 | 0.99 | 0.017 | 0.015 |

Note: Film thickness of coated aluminium: 100 microns

Table 4

| Run No. | Composition of weld metal | | | Impact value of weld metal, Kg-m | | |
|---|---|---|---|---|---|---|
| | Si | Mn | Al | $vE_{20}$ | $vEo$ | $vE-20$ |
| A | 0.25 | 0.98 | 0.042 | 15.7 | 15.0 | 10.1 |
| B | 0.27 | 0.95 | 0.045 | 12.3 | 8.7 | 8.0 |
| C | 0.22 | 0.86 | 0.043 | 15.9 | 15.7 | 15.1 |
| D | 0.29 | 1.02 | 0.042 | 15.3 | 10.3 | 6.1 |
| E | 0.31 | 1.01 | 0.050 | 13.3 | 8.4 | 5.5 |
| F | 0.52 | 1.50 | 0.118 | 6.4 | 3.6 | 1.9 |
| G | 0.43 | 1.35 | 0.073 | 4.0 | 2.7 | 1.4 |
| H | 0.55 | 1.56 | 0.130 | 4.2 | 3.0 | 1.5 |
| I | 0.46 | 1.32 | 0.087 | 6.8 | 3.5 | 2.2 |

As shown in the test results in this example, when the Si- and Mn-contents are decreased in the welding materials, it can be seen that the weld metal obtained has a better toughness.

EXAMPLE 2

When steel plates spray-coated with molten aluminium, as shown in Table 5, were fillet welded by employing a covered electrode having a composition as shown in Table 6, the test results were as shown in Table 7.

Table 5

| | Chemical composition of base metal, % by weight | | | | | Film thickness of Al, microns |
|---|---|---|---|---|---|---|
| | C | Si | Mn | P | S | |
| Steel plate spray-coated with molten aluminium having a thickness of 12 mm | 0.14 | 0.40 | 1.29 | 0.023 | 0.010 | |

Table 6

| | Composition of welding materials of arc welding electrode coated with a flux, % by weight | | | | | | |
|---|---|---|---|---|---|---|---|
| | Covered electrode having a diameter of 5.0mm of this invention (Total contents in the core and coated flux) | | | | | Conventional covered electrode of low-hydrogen type having a diameter of 5.0mm | |
| | No. 1 | No. 2 | No. 3 | No. 4 | No. 5 | No. 6 | No. 7 |
| Si | 1.2 | 1.2 | 0.8 | 0.8 | 1.4 | 2.2 | 2.9 |
| Mn | — | — | — | 0.5 | — | 0.5 | 0.6 |
| $CaCO_3$ | 17.7 | 15 | 18 | 17.7 | 11.4 | 15 | 15.75 |
| $CaF_2$ | 6.3 | 9 | 6.6 | 6.3 | 4.5 | 4.8 | 1.5 |
| MgO | 0.45 | 0.45 | 0.6 | 0.45 | 0.3 | 0.3 | — |
| $ZrSiO_4$ | 0.75 | 0.75 | 0.75 | 0.75 | 0.6 | — | — |
| $TiO_2$ | 1.5 | 1.5 | 1.65 | 1.5 | 1.35 | 2.25 | 1.2 |
| Mica | 0.75 | 0.75 | 0.75 | 0.75 | 0.66 | 0.36 | 0.6 |
| Sodium alginate | 0.15 | 0.15 | 0.15 | 0.15 | 0.09 | 0.09 | 0.15 |
| Fe | Balance | Balance | Balance | Balance | Balance | Balance | Balance |
| Basicity | 10.3 | 8.8 | 10.7 | 10.3 | 8.7 | 5.8 | 6.8 |

Table 7

| Welding electrode to be tested | | Test results of weld metal | | | | | Commercially available electrode | |
|---|---|---|---|---|---|---|---|---|
| | | Electrode of this invention | | | | | | |
| | | No. 1 | No. 2 | No. 3 | No. 4 | No. 5 | No. 6 | No. 7 |
| Chemical composition of weld metal | C | 0.10 | 0.11 | 0.12 | 0.10 | 0.11 | 0.12 | 0.12 |
| | Si | 0.46 | 0.48 | 0.34 | 0.23 | 0.24 | 0.90 | 1.13 |
| | Mn | 0.57 | 0.60 | 0.73 | 1.08 | 0.68 | 1.23 | 1.42 |
| | Sol. Al | 0.11 | 0.11 | 0.15 | 0.20 | 0.23 | 0.36 | 0.25 |
| Hardness of weld metal[1] | | 238Hv | 236Hv | 238Hv | 221Hv | 228Hv | 283Hv | 328Hv |
| Cross fillet tension test[2] | Tensile strength, Kg/mm | 55.3 | 54.7 | 53.6 | 56.2 | 54.5 | 54.8 | 55.3 |
| | Broken area | Depo. | Base metal | Depo. | Depo. | Depo. | Base metal | Base metal |
| | Appearance of bead | ◎ | ○ | ○ | ◎ | ◎ | x | x |
| | Fluidity of slag | ○ | ◎ | ○ | ◎ | Δ | x | x |

Table 7-continued

| Welding electrode to be tested | | Test results of weld metal | | | | | Commercially available electrode | |
|---|---|---|---|---|---|---|---|---|
| | | Electrode of this invention | | | | | | |
| | | No. 1 | No. 2 | No. 3 | No. 4 | No. 5 | No. 6 | No. 7 |
| results of weld metal | Covering property of slag | ○ | ▲ | ○ | ○ | ◎ | × | × |
| | Peeling-off of slag | ○ | ○ | ○ | ▲ | ▲ | ▲ | × |
| | Overall evaluation | ◎ | ○ | ○ | ○ | ○ | × | × |
| Pits and blow holes | | Nil | Nil | Nil | Nil | Nil | Nil | Nil |
| Cracks | | Nil | Nil | Nil | Nil | Nil | Nil | occur |

Note:
[1] Tested according to Vickers hardness tester under a load of 10 Kgs
[2] Tested by the method according to JIS Z-3131
[3] Tested by the methods according to JIS Z-3002 and compared with the results obtained by welding bare steel plate with commercially available electrode under the following criteria:
◎ : Excellent
○ : Same
▲ : Slightly inferior
× : Inferior

EXAMPLE 3

Steel plates having the dimensions and composition as shown in Table 8 were spray-coated with molten aluminium in an average film thickness of 70 microns. The plates were then fillet welded by carbon dioxide gas arc welding. In examples of this invention and comparative examples, composite electrodes as shown in Table 9 were employed and welded under the conditions as shown in Table 10. Table 11 shows comparisons of the welding results. From these results, it can be seen that properties of the weld metals and state of welded area are superior in the use of electrodes according to this invention to conventional ones.

Table 8

| Composition of hot rolled steel plate to be employed (thickness: 12mm) | | | | |
|---|---|---|---|---|
| C | Si | Mn | P | S |
| 0.14 | 0.40 | 1.29 | 0.009 | 0.010 |

Table 9

| | | Chemical composition of welding materials, % by weight | | | | | | | | | | | | | Basicity |
|---|---|---|---|---|---|---|---|---|---|---|---|---|---|---|---|
| | | Enclosed flux | | | | | | | Hoop | | | | | | |
| | | Si | Mn | CaCO$_3$ | CaO | CaF$_2$ | TiO$_2$ | SiO$_2$ | Others | C | Si | Mn | Mo | P | S | Fe | |
| Composite-electrode of this invention | 1 | 0.1 | 0.5 | 0.4 | 1.2 | 7.2 | 4.6 | 1.0 | — | 0.05 | <0.1 | 0.3 | — | — | — | Balance | 1.4 |
| | 2 | 0.3 | 0.6 | 0.4 | 1.2 | 6.5 | 5 | 1.0 | — | " | " | " | — | — | — | " | 1.4 |
| | 3 | 0.3 | 0.7 | 0.8 | 1.0 | 5.7 | 5 | 1.4 | — | " | " | " | — | — | — | " | 1.0 |
| | 4 | 0.14 | 0.4 | 0.6 | 1.0 | 6.46 | 5 | 1.0 | — | 0.06 | 0.29 | 0.3 | 0.16 | — | — | " | 1.3 |
| | 5 | 0.14 | 0.4 | 0.4 | 1.0 | 8.52 | 4.6 | 0.8 | Ni 1.34 Cr 0.4 | " | " | " | " | — | — | " | 1.5 |
| | 6 | 0.14 | 0.4 | 0.4 | 1.0 | 8.2 | 3.6 | 0.8 | Ni 1.34 Cr 0.1 Mo 0.4 | " | " | " | " | — | — | " | 1.5 |
| Conventional composite electrode | 7 | 0.6 | 1.6 | 0.8 | 3.0 | 4.3 | 5.0 | 1.0 | — | 0.06 | <0.1 | 0.3 | — | — | — | " | 3.4 |
| | 8 | 0.7 | 1.6 | 0.4 | 1.2 | 3.1 | 8 | 1.6 | — | " | " | " | — | — | — | " | 0.9 |
| | 9 | 0.7 | 1.5 | 1.6 | 1.2 | 6.7 | 1.6 | 3.0 | — | " | " | " | — | — | — | " | 0.7 |

Table 10

| Welding conditions | | | | | |
|---|---|---|---|---|---|
| Current Amp | Voltage V | Welding speed cm/min | Flow rate of shielded CO$_2$ liters/min. | Welding position | Power source |
| 300 | 36~38 | 37 | (CO$_2$) 25 | Horizontal fillet | DC, Constant Voltage, reverse polarity |

Table 11

| Electrode | Welding results | | | | | | | | |
|---|---|---|---|---|---|---|---|---|---|
| | Composition of weld metal, % by weight | | | | | Properties of weld metal | | | |
| | C | Si | Mn | Sol Al | Others | Hardness (Hv) | Blow holes | Cracks | Appearance of bead | Peeling-off of slag |
| 1 | 0.09 | 0.28 | 0.9 | 0.24 | — | 203 | Nil | Nil | Good | Good |
| 2 | 0.10 | 0.31 | 1.08 | 0.25 | — | 235 | " | " | " | " |

Table 11-continued

| | Electrode | Composition of weld metal, % by weight | | | | | Welding results | | | | |
| --- | --- | --- | --- | --- | --- | --- | --- | --- | --- | --- | --- |
| | | | | | | | Properties of weld metal | | | | |
| | | C | Si | Mn | Sol Al | Others | Hardness (Hv) | Blow holes | Cracks | Appearance of bead | Peeling-off of slag |
| Example | 3 | 0.11 | 0.33 | 1.30 | 0.28 | — | 248 | ″ | ″ | ″ | ″ |
| | 4 | 0.10 | 0.38 | 1.35 | 0.26 | Mo 0.15 Ni 1.8 | 263 | ″ | ″ | ″ | ″ |
| | 5 | 0.08 | 0.35 | 1.25 | 0.20 | Cr 0.45 Mo 0.15 Ni 1.8 | 281 | ″ | ″ | ″ | ″ |
| | 6 | 0.08 | 0.37 | 1.20 | 0.23 | Cr 0.8 Mo 0.6 | 294 | ″ | ″ | ″ | ″ |
| Comparative example | 7 | 0.09 | 0.55 | 1.49 | 0.15 | | 284 | ″ | ″ | Poor | ″ |
| | 8 | 0.10 | 0.55 | 1.48 | 0.20 | | 274 | Occur | ″ | ″ | Good |
| | 9 | 0.12 | 0.59 | 1.45 | 0.18 | | 283 | Nil | ″ | ″ | ″ |

What we claim is:

1. Welding materials for aluminium-coated steel comprising on weight basis less than 1.5% of Si, and less than 1.0% of Mn, 2 to 15% of $CaF_2$, and 15 to 50% of a mixture of oxides having a basicity ranging from 1.0 to 12.5, the balance being essentially Fe.

2. Welding materials for submerged arc welding according to claim 1 comprising on weight basis 0.1 to 0.3% of Si and 0.3 to 0.8% of Mn.

3. Welding materials for covered electrode arc welding according to claim 1 comprising on weight basis less than 1.5% of Si, less than 1.0% of Mn, 2 to 10% of $CaF_2$, 6 to 20% of $CaCO_3$, 0.3 to 2.0% of a mixture of MgO and $TiO_2$ and less than 1% of organic materials, the balance being Fe.

4. Welding materials for carbon dioxide gas shielded arc welding according to claim 1 comprising on weight basis 0.1 to 0.5% of Si, 0.3 to 1.1% of Mn, 4 to 10% of $CaF_2$, 0.4 to 4% of $CaCO_3$, 0.6 to 2% of $SiO_2$, less than 2% of CaO and 2 to 6% of $TiO_2$, the balance being essentially Fe.

5. Welding materials according to claim 1 comprising on weight basis less than 0.15% of Si, less than 0.35% of Mn, 4 to 5% of $CaF_2$ and 37.5 to 45.7% of a mixture of oxides having a basicity ranging from 1.7 to 6.3, the balance being essentially Fe.

6. Welding materials according to claim 3 comprising on weight basis 0.8 to 1.4% of Si, less than 0.5% of Mn, 6.3 to 9% of $CaF_2$, 11.4 to 18% of $CaCO_3$, 1.2 to 1.65% of a mixture of MgO and $TiO_2$ and 0.75 to 0.9% of organic materials, the balance being essentially Fe.

7. Welding materials according to claim 4 comprising on weight basis 0.1 to 0.43% of Si, 0.7 to 1.0% of Mn, 5.7 to 8.52% of $CaF_2$, 0.4 to 0.8% of $CaCO_3$, 0.8 to 1.4% of $SiO_2$ and 3.6 to 5% of $TiO_2$, the balance being essentially Fe.

* * * * *